(12) United States Patent
Neetz (10) Patent No.: US 10,757,867 B2
(45) Date of Patent: Sep. 1, 2020

(54) SEEDING DEVICE TO SEPARATE SMALL SEEDS FOR GARDENING INTO MEASURABLE INCREMENTS FOR PLANTING

(71) Applicant: Kirk A. Neetz, Lemont, IL (US)

(72) Inventor: Kirk A. Neetz, Lemont, IL (US)

(73) Assignee: SOW PERFECT SEED CO., Lemont, IL (US)

( * ) Notice: Subject to any disclaimer, the term of this patent is extended or adjusted under 35 U.S.C. 154(b) by 113 days.

(21) Appl. No.: 15/563,223

(22) PCT Filed: Mar. 31, 2016

(86) PCT No.: PCT/US2016/025218
§ 371 (c)(1),
(2) Date: Sep. 29, 2017

(87) PCT Pub. No.: WO2016/161087
PCT Pub. Date: Oct. 6, 2016

(65) Prior Publication Data
US 2018/0084735 A1    Mar. 29, 2018

Related U.S. Application Data

(60) Provisional application No. 62/140,656, filed on Mar. 31, 2015.

(51) Int. Cl.
*A01C 7/02* (2006.01)
*A01G 9/08* (2006.01)
(Continued)

(52) U.S. Cl.
CPC ............. *A01G 9/085* (2013.01); *A01C 7/02* (2013.01); *A01G 7/00* (2013.01); *A01G 9/0295* (2018.02)

(58) Field of Classification Search
CPC ...... A01G 9/085; A01G 9/029; A01G 9/0295; A01G 9/0299; A01G 7/00; A01C 7/00;
(Continued)

(56) References Cited

U.S. PATENT DOCUMENTS 736,252 A * 8/1903 Hering .................. A01C 5/02
                                                   47/1.7
2,507,792 A * 5/1950 King ...................... A61J 7/02
                                                   193/1

(Continued)

FOREIGN PATENT DOCUMENTS

AT    128403 B   *  5/1932
FR    2627936 A1 *  9/1989 ............... A01C 7/02
(Continued)

OTHER PUBLICATIONS

Machine translation of FR 2627936 to Avon, published Sep. 1989.*
(Continued)

*Primary Examiner* — Kathleen I Alker
(74) *Attorney, Agent, or Firm* — King & Schickli, PLLC (57) ABSTRACT

A seeding device is provided. That seeding device includes a seeding paddle having a plurality of seed holders and a seed tray having a channel. The channel receives the seeding paddle so that seeds in the seed tray are easily directed into the plurality of seed holders. The paddle may then be removed from the seeding tray for planting seeds in a desired quantity at the desired spaced locations.

13 Claims, 9 Drawing Sheets

(51) Int. Cl.
*A01G 7/00* (2006.01)
*A01G 9/029* (2018.01)

(58) Field of Classification Search
CPC ..... A01C 7/02; A01C 7/16; A61J 7/02; A47G 19/24; B65D 83/04
USPC ....... 47/58.1 SE, 77; 414/675; 221/189, 263, 221/288; 222/457.5, 480
See application file for complete search history.

(56) References Cited

U.S. PATENT DOCUMENTS

| | | | | | |
|---|---|---|---|---|---|
| 2,536,127 | A | * | 1/1951 | De Philip | A61J 7/02 414/675 |
| 3,007,570 | A | * | 11/1961 | Davidson | A01C 7/02 206/526 |
| 3,073,486 | A | * | 1/1963 | Ratcliffe | A01C 7/04 222/162 |
| 3,255,894 | A | * | 6/1966 | Van Handel | A61J 7/02 414/675 |
| 3,307,749 | A | * | 3/1967 | Ursetta | A01C 7/02 222/276 |
| 3,402,827 | A | * | 9/1968 | White | A61J 7/02 414/675 |
| 3,461,643 | A | * | 8/1969 | Strand | A61J 7/02 53/471 |
| 3,662,904 | A | * | 5/1972 | Tune | A61J 7/02 414/675 |
| 3,848,395 | A | * | 11/1974 | Totten | A61J 7/02 53/473 |
| 4,065,000 | A | * | 12/1977 | Murton | A61J 7/02 414/675 |
| 4,072,251 | A | * | 2/1978 | Huang | A01C 7/04 111/200 |
| 4,573,609 | A | * | 3/1986 | Tesch, Jr. | A01C 7/042 221/211 |
| 4,685,271 | A | * | 8/1987 | Ringer | A61J 7/02 53/246 |
| 6,142,083 | A | * | 11/2000 | Cox, Jr. | A01C 7/04 111/105 |
| 7,021,492 | B2 | * | 4/2006 | Priebe | A61J 7/02 221/296 |
| 7,067,834 | B2 | * | 6/2006 | Horigane | G01N 1/36 250/576 |
| 7,240,806 | B2 | * | 7/2007 | Choi | B65D 83/02 221/212 |
| 8,286,387 | B2 | * | 10/2012 | Becker | G01N 1/286 47/56 |
| 8,353,249 | B2 | | 1/2013 | Louis-Seize | |
| 8,567,327 | B1 | * | 10/2013 | Spencer | A01C 7/02 111/900 |
| 2007/0271840 | A1 | * | 11/2007 | Amberson | A01G 9/0295 47/18 |
| 2009/0249989 | A1 | | 10/2009 | Garrett | |
| 2012/0126554 | A1 | | 5/2012 | Becker et al. | |

FOREIGN PATENT DOCUMENTS

| | | | | | |
|---|---|---|---|---|---|
| GB | 1338400 | A | * | 11/1973 | A01C 7/02 |
| GB | 2191672 | A | * | 12/1987 | A01C 7/02 |
| GB | 2293744 | A | * | 4/1996 | A01C 1/06 |
| GB | 2463776 | A | * | 3/2010 | A01C 7/02 |

OTHER PUBLICATIONS

Machine translation of AT 128403 to Neubauer, published May 1932.*

PCT/US2016/025218—International Search Report and Written Opinion of the International Searching Authority dated Jun. 21, 2016.

* cited by examiner

SEEDING DEVICE TO SEPARATE SMALL SEEDS FOR GARDENING INTO MEASURABLE INCREMENTS FOR PLANTING

This application claims the benefit of U.S. Provisional Patent Application Ser. No. 62/140,656 filed on 31 Mar. 2015, the full disclosure of which is incorporated herein by reference.

TECHNICAL FIELD

This document relates generally to the horticulture field and, more particularly, to a new and improved seeding device.

BACKGROUND

Seeds planted by hand, especially small seeds are very difficult to control. As a consequence, too many seeds are often planted at a time. The end result is a considerable waste of resources because seed growth is hindered and the young seedlings must undergo thinning. Accordingly, a seeding device, a seeding kit, and a method of using the same are herein provided to eliminate the need for the thinning process while simultaneously promoting better seed growth and yield.

SUMMARY

In accordance with the purposes and benefits described herein, a seeding device is provided. That seeding device comprises a seeding paddle including a plurality of seed holders and a seed tray having a channel for receiving the seeding paddle wherein seeds in the seed tray are easily directed into the plurality of seed holders.

The seeding paddle may include a first face and a second face. The first face may include a first partition flange dividing the first face into a first section and a second section. A first set of seed holders may be provided on the first section of the first face and a second set of seed holders may be provided on the second section of the first face.

Further, the second face may include a second partition dividing the second face into a third section and a fourth section. A third set of seed holders may be provided on the third section of the second face while a fourth set of seed holders may be provided on the fourth section of the second face. In one particularly useful embodiment, the first set of seed holders are a first size, the second set of seed holders are a second size, the third set of seed holders are a third size and the fourth set of seed holders are a fourth size. The first size, the second size, the third size and the fourth size are all different so that the paddles may be efficiently and effectively utilized to separate different sizes of the seeds into measurable increments for proper planting at a desired spacing.

Each of the sets of seed holders may include a plurality of cavities. In one possible embodiment, those cavities are cylindrical in shape. In another possible embodiment, those cavities are frustoconical in shape. Further, it should be appreciated that the seeding paddle may include a handle.

The seed tray includes a seed support surface and a raised edge to maintain seeds on the seed support surface. The channel divides the seed support surface into two sections.

The channel may include a support shelf dividing the channel into a first portion that receives the first partition flange or the second partition flange on the seeding paddle and a second portion wherein the second portion has a width $W_2$ and the first portion has a width $W_1$ where $W_2 > W_1$.

The first face of the seeding paddle is held flush with the seed support surface when the second face is resting on the support shelf. In contrast, the second face of the seeding paddle is held flush with the seed support surface when the first face is resting on the support shelf.

In one particularly useful embodiment, the seed channel includes an opening at one end. That opening may be utilized to recover any excess seeds on the seed tray when planting is completed. The handle includes a stop that is sized and shaped to correspond to the opening so that the opening is closed when the seeding paddle is seated in the seed tray in order to distribute seeds into the desired seed holders.

In accordance with yet another embodiment, a seeding kit is provided for hand seeding. That seeding kit comprises a first seeding paddle having a first set of seed holders on a first side and a second set of seed holders on a second side. The seeding kit also includes a second seeding paddle having a third set of seed holders on a third side and a fourth set of seed holders on a fourth side. Further, the seeding kit includes a seed tray having a seed support surface and a channel for receiving and holding the first seeding paddle with the first side up, the first seeding paddle with the second side up, the second seeding paddle with the third side up or the second seeding paddle with the fourth side up whereby seeds may be directed from the seed support surface into the one of the first set of seed holders, second set of seed holders, third set of seed holders and fourth set of seed holders as desired. In one particularly useful embodiment, the first set of seed holders are a first size, the second set of seed holders are a second size, the third set of seed holders are a third size and the fourth set of seed holders are a fourth size. All of the four sizes are different in order to accommodate different sizes of seeds.

In accordance with still another aspect, a method is provided of planting seeds in a substrate. That method comprises the steps of: (a) selecting a seeding paddle with a plurality of spaced seed holders of desired size for seeds to be planted, (b) placing the seeding paddle on a seed tray, (c) shaking seeds on the seed tray into the plurality of spaced seed holders, (d) removing the seeding paddle from the seed tray and (e) delivering the seeds from the plurality of spaced seed holders onto the substrate at spaced locations. Further, the method may include the step of recovering any excess seeds on the seed tray by tipping the seed tray to cause the excess seeds to be dispensed from the seed tray through a seed recovery opening.

In the following description, there are shown and described several preferred embodiments of the seeding device. As it should be realized, the seeding device is capable of other, different embodiments and its several details are capable of modification in various, obvious aspects all without departing from the seeding device as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the seeding device and together with the description serve to explain certain principles thereof. In the drawing figures:

FIG. 6 illustrates how the seeding paddle may be removed from the seed tray and utilized to plant seeds at desired spaced locations on a substrate such as a seedling tray including correspondingly spaced seedling compartments.

Reference will now be made in detail to the present preferred embodiments of the seeding device, examples of which are illustrated in the accompanying drawing figures.

DETAILED DESCRIPTION

Figure 1:
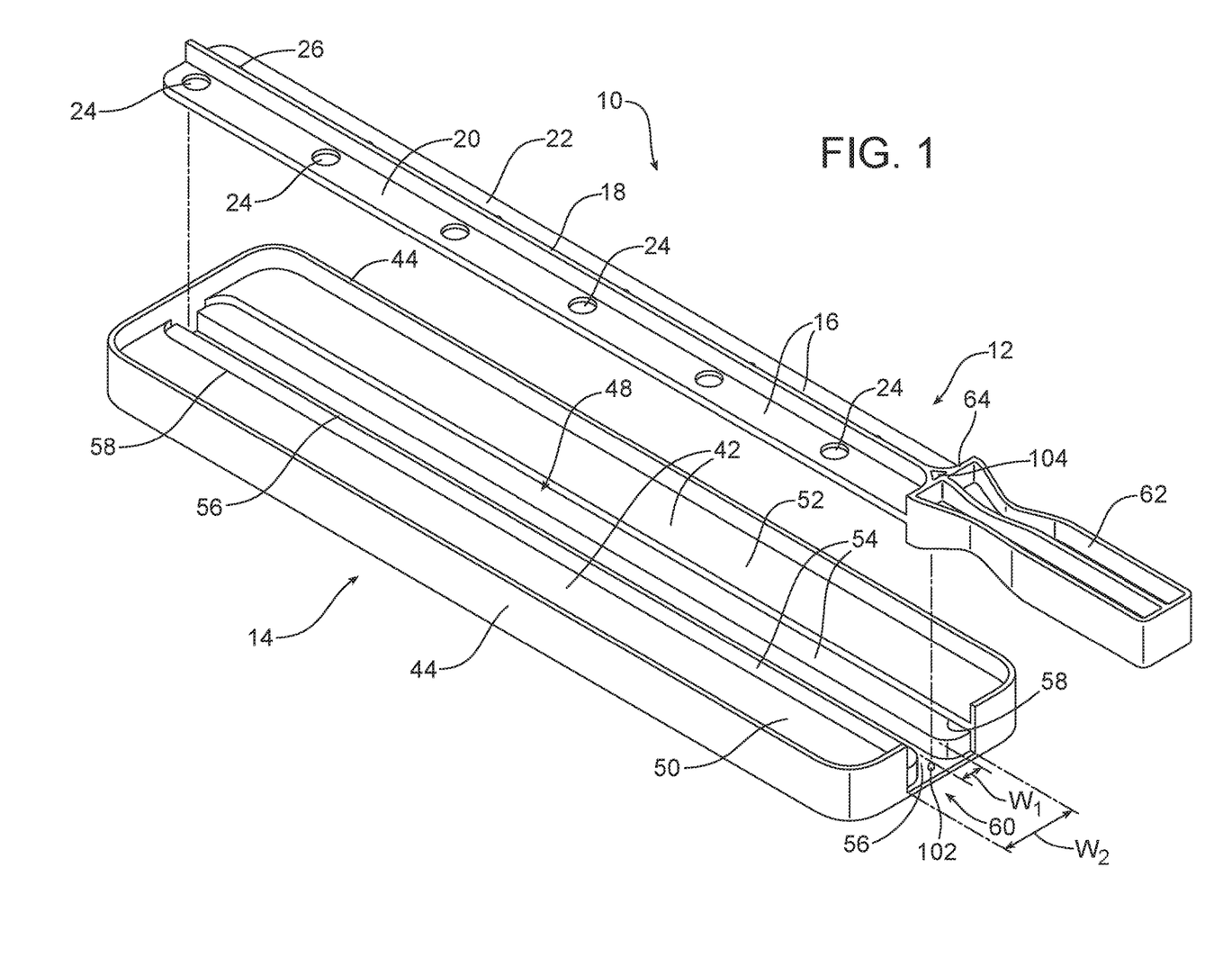
FIG. 1 is an exploded perspective view of a seeding device incorporating a seeding paddle and a seed tray.
Figure 4:
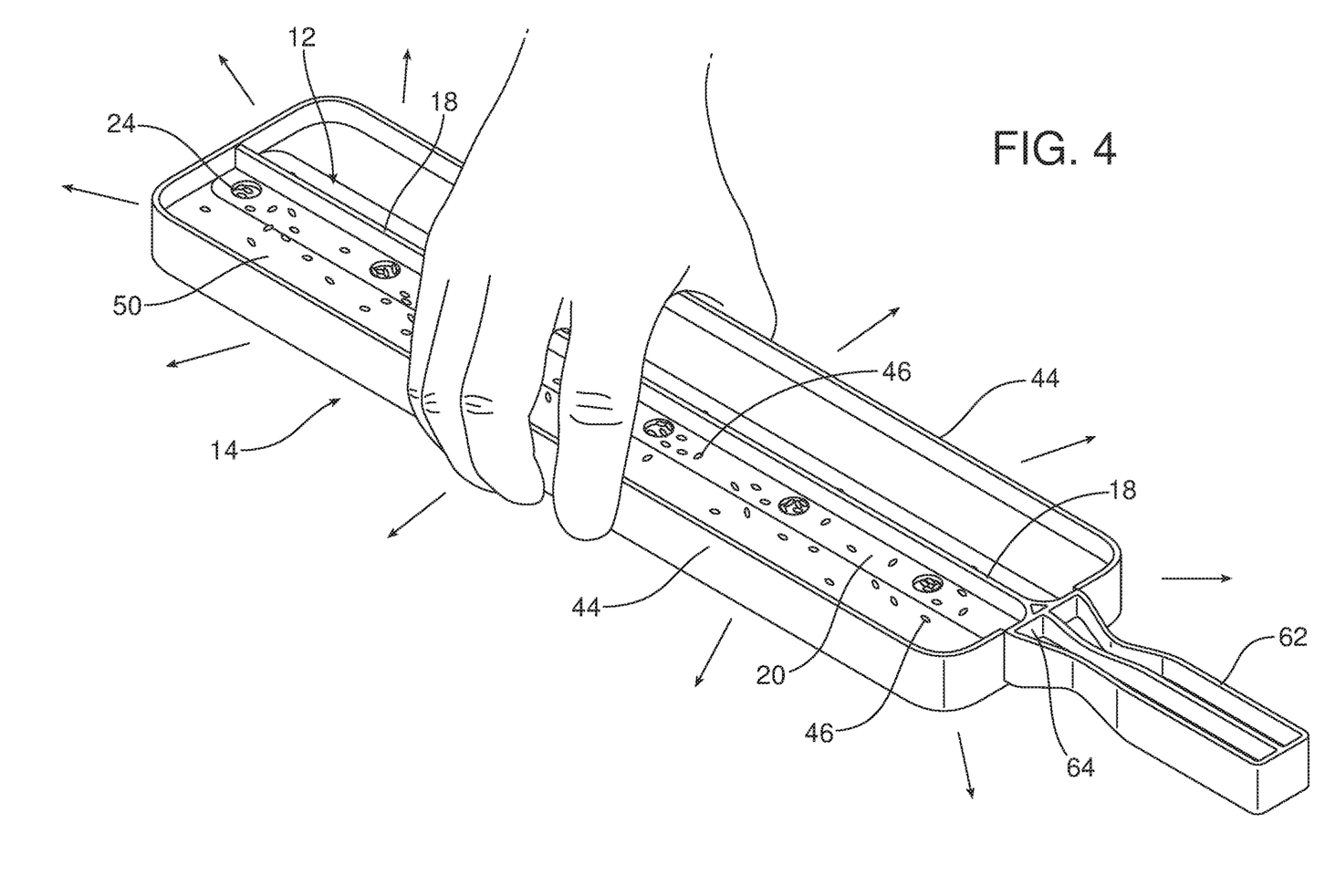
FIG. 4 is a view similar to FIG. 3 but showing how the seeding device may be shaken to direct seeds into the plurality of seed holders provided in the seeding paddle.
Figure 5:
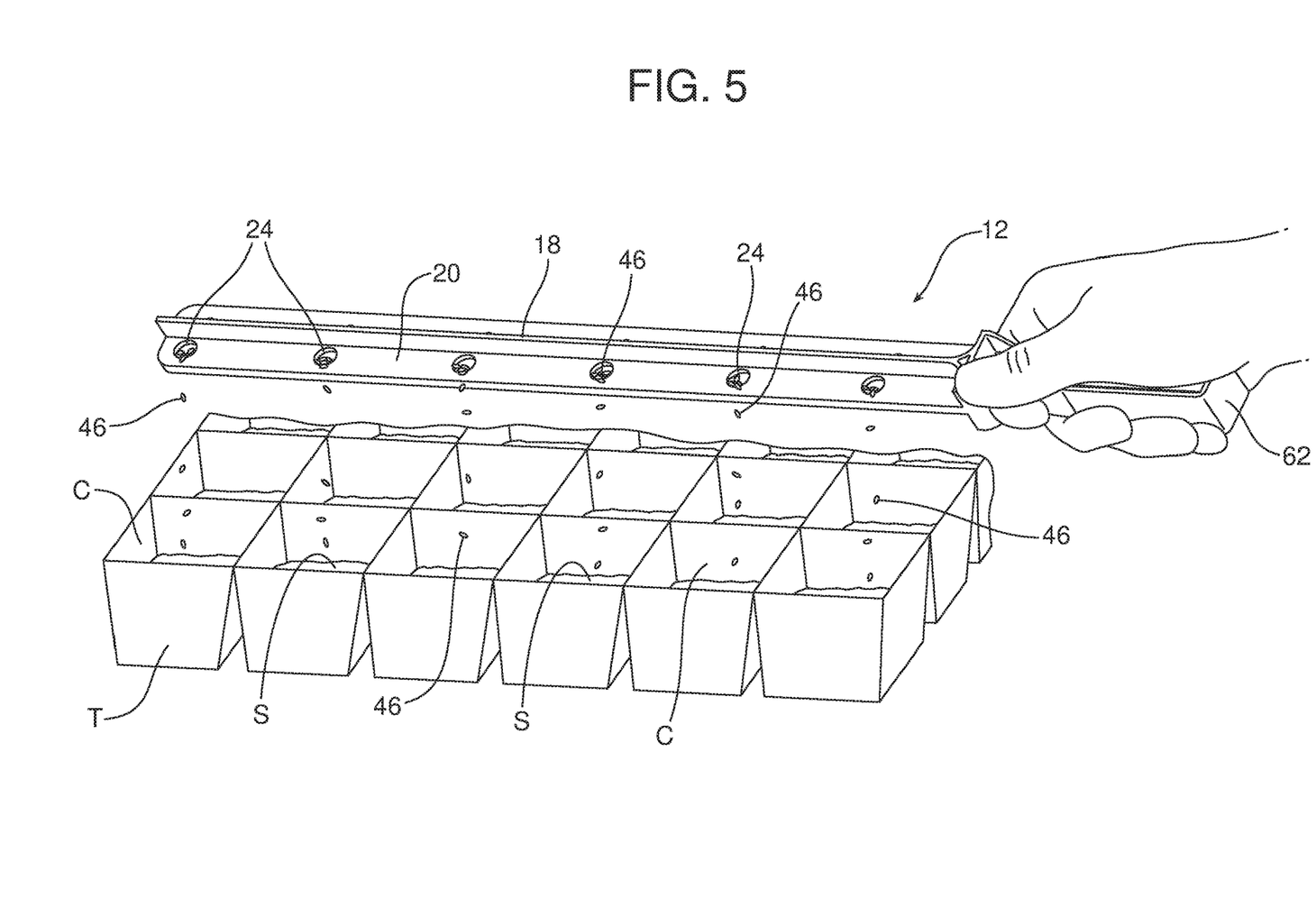
FIG. 5 is a view similar to FIG. 4 but showing all of the seeds directed and held in the plurality of seed holders on the seeding paddle.
Figure 6A:
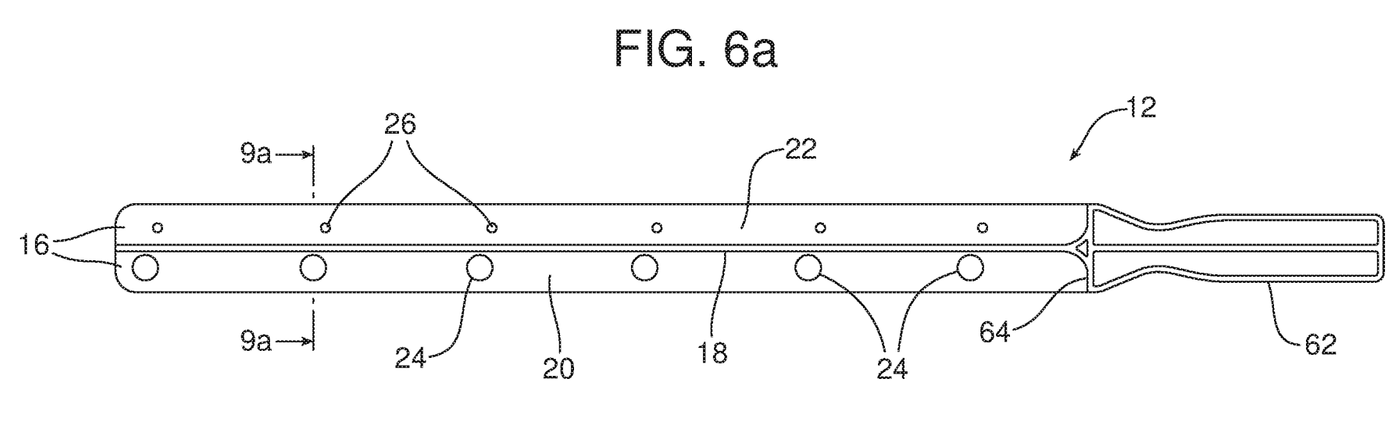
FIGS. 6a and 6b are top plan views of the respective first faces and second faces of a first seeding paddle.
Figure 6B:
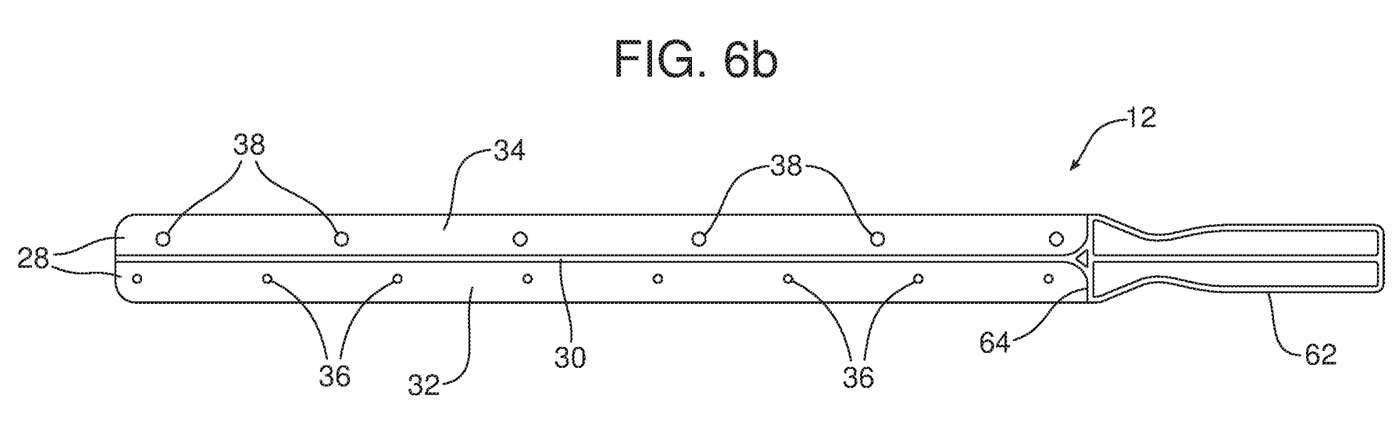

Reference is now made to FIGS. 1-5 illustrating a seeding device 10 as well as a method of planting seeds in a substrate, such as the soil S, held in a seedling tray T. As illustrated, the seeding device 10 includes a seeding paddle 12 and a seed tray 14. As best illustrated in FIGS. 1, 6a and 6b, the seeding paddle 12 includes a first face 16 having a first partition flange 18 that divides the first face into a first section 20 and a second section 22. A first set of seed holders 24 are provided at spaced locations along the first section 20 while a second set of seed holders 26 are provided at spaced locations along the second section 22.

Figure 9A:
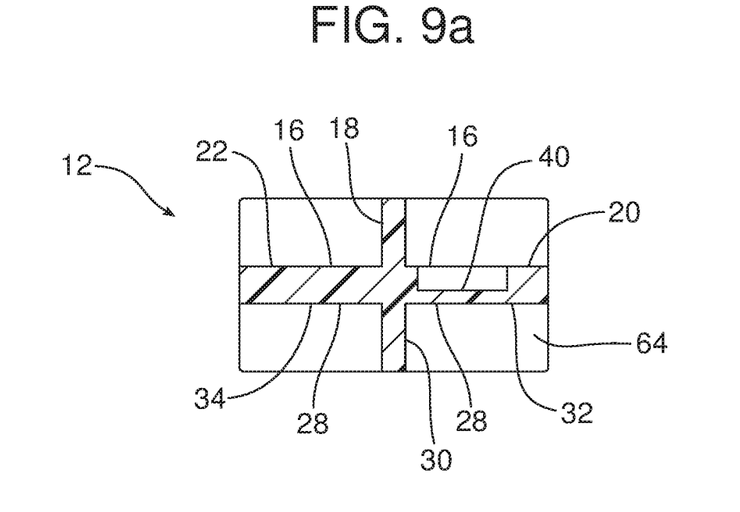
FIGS. 9a and 9b are respective views of a seeding paddle incorporating a cylindrically shaped seed holding cavity and a frustoconically shaped seed holding cavity.
Figure 9B:
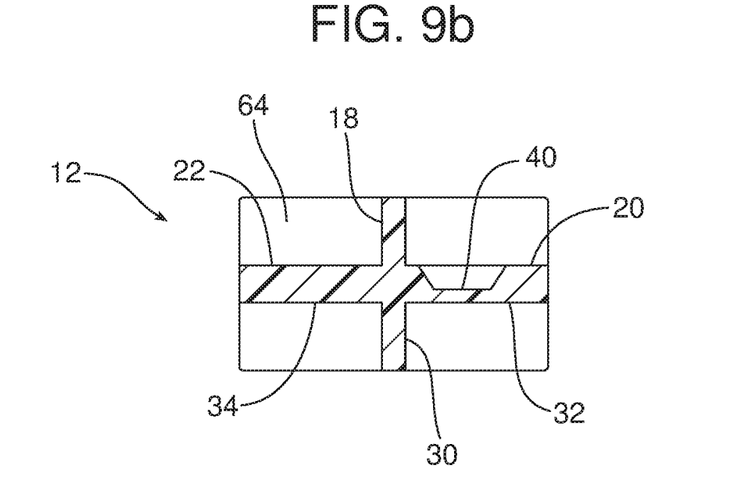

As illustrated in FIG. 6b, the seeding paddle 12 also includes a second face 28 opposite the first face 16. The second face 28 includes a second partition flange 30 dividing the second face into a third section 32 and a fourth section 34. A third set of seed holders 36 are provided at spaced locations along the third section 32 while a fourth set of seed holders 38 are provided at spaced locations along the fourth section 34. As should be appreciated, the first, second, third and fourth sets of seed holders 24, 26, 36, 38 may comprise closed-end cavities of substantially any desired shape. In one possible embodiment, the seed holder cavities 40 may be cylindrical in shape (see FIG. 9a). In another possible embodiment, the seed holder cavities may be frustoconical in shape (see FIG. 9b).

As best illustrated in FIGS. 1-5, the seed tray 14 includes a seed support surface 42 and a raised edge 44 to maintain seeds 46 on the seed support surface. Further, the seed tray 14 includes a channel 48 that divides the seed support surface 42 into two sections 50, 52. As will be apparent from the following description, the channel 48 is adapted to receive the seeding paddle 12 so that seeds 46 in the seed tray 14 are easily directed into any one of the plurality of the selected sets of the seed holders 24, 26, 36 or 38.

As further illustrated in FIGS. 1-5, the channel 48 includes a support shelf 54 dividing the channel into a first portion 56 that receives the first partition flange 18 or the second partition flange 30 and a second portion 58 where the second portion has a width $W_2$ and the first portion 56 has a width $W_1$ where $W_2 > W_1$.

Figure 2:
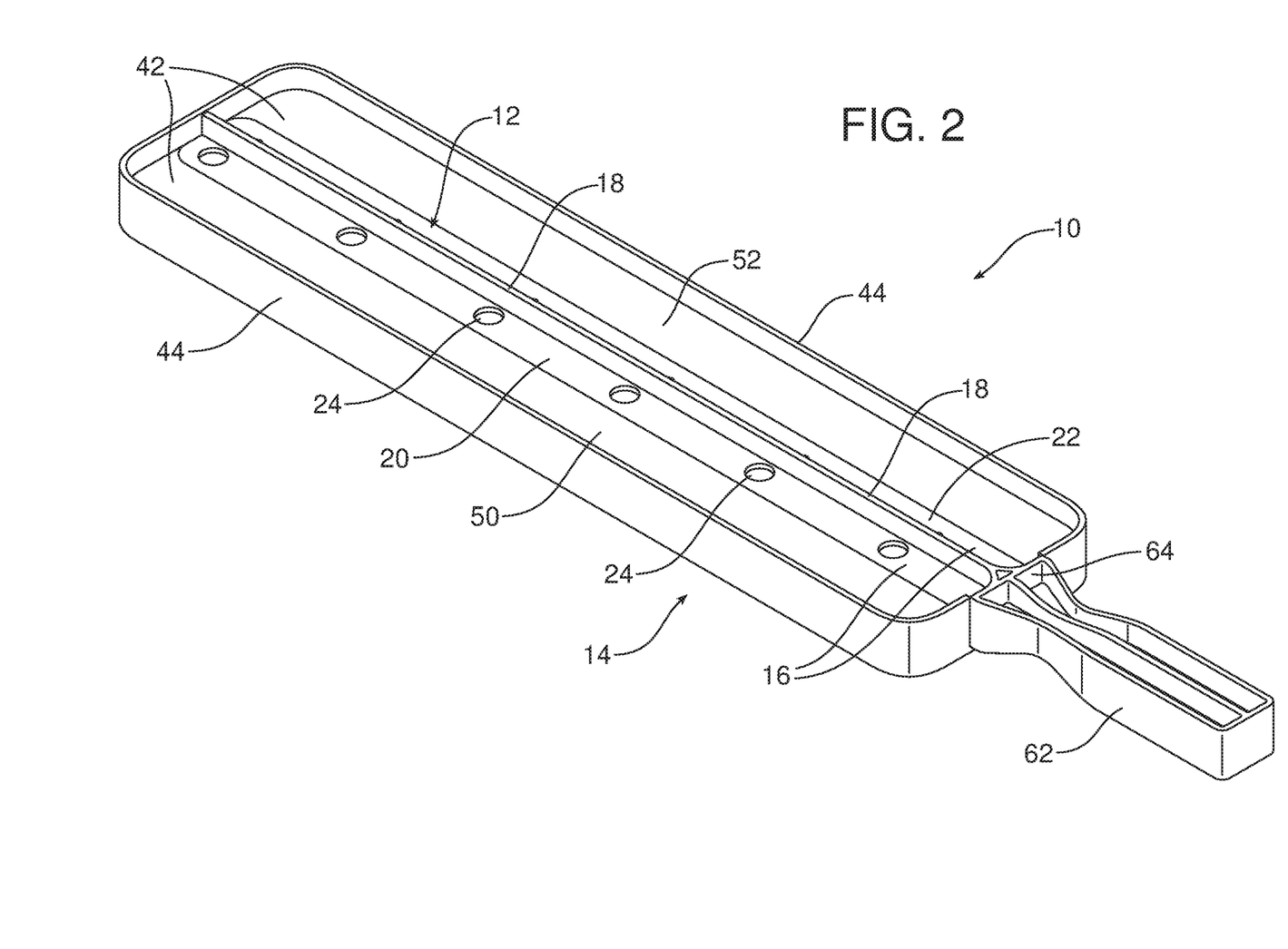
FIG. 2 is a perspective view similar to FIG. 1 but showing the seeding paddle positioned in the seed tray.

As best illustrated in FIG. 2, when the seeding paddle 12 is seated in the seed tray 14 with the second partition flange 30 in the first portion 56 of channel 48, the second face 28 of the seeding paddle 12 is seated on the support shelf 54 and the first face 16 of the seeding paddle is flush with the seed support surface 42.

Figure 3:
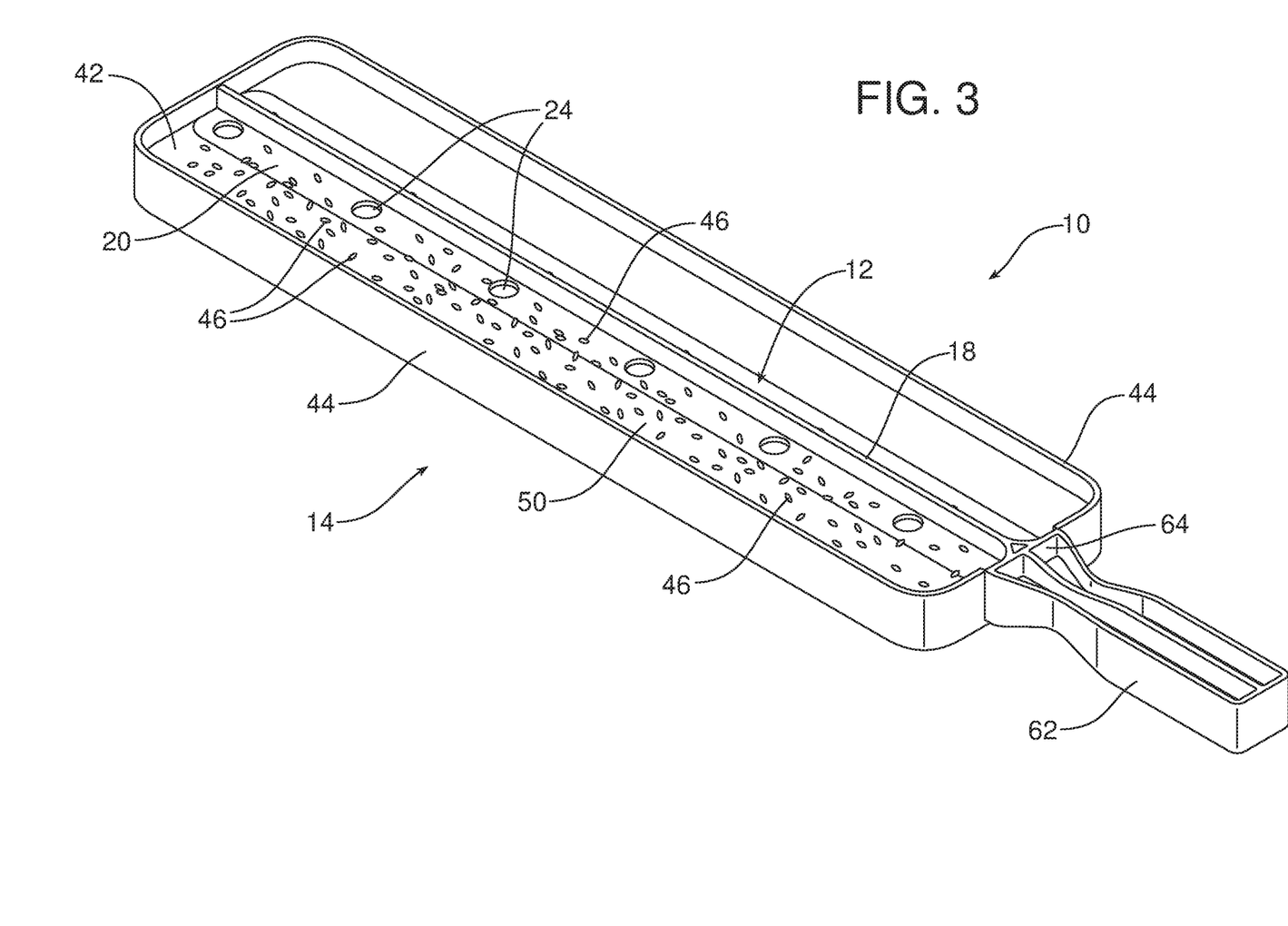
FIG. 3 is a view similar to FIG. 2 but illustrating a plurality of seeds resting on one section of the seed support surface of the seed tray and a first section of the seeding paddle.

With reference back to FIG. 1, it should be appreciated that the channel 48 includes an opening 60 at one end. Further, the seeding paddle 12 includes a handle 62 that includes a stop 64. The stop 64 is sized and shaped to correspond to the opening 60 so that the opening 60 is closed when the seeding paddle 12 is seated in the seed tray 14 as illustrated in FIGS. 2-4.

Seeds 46 may be added or dropped onto the seed support surface 42 when the seeding paddle 12 is properly seated in the seed tray 14. As illustrated in FIG. 4, one then gently shakes the seeding device 10 until the desired number of seeds 46 are delivered to and held in each seed holding cavity of the selected set of seed holders 24, 26, 36 or 38. Here it should be appreciated that the raised edge 44 of the seed tray 14, the exposed partition flange 18 of the seeding paddle 12 and the stop 64 on the handle 62 function together to form a fully enclosed sidewall for holding the seeds 46 where they can be easily delivered into the selected set of seed holders 24, 26, 36 and 38.

For some applications, the selected set of seed holders 24, 26, 36, 38 will receive a single seed each. In other applications, each seed holder will receive multiple seeds. The size of the seed holder 24, 26, 36, 38 selected for planting will be determined by the size and type of seed being planted.

Once the selected seed holders 24, 26, 36 or 38 have been properly filled with seeds 46, the seeding paddle 12 is removed from the seed tray 14. Then, as illustrated in FIG. 5, the seeding paddle 12 is positioned over the substrate S to be planted. In the illustrated embodiment, the spacing of the cavities 40 of the first set of seed holders 24 corresponds with the spacing between the seedling compartments C in the seedling tray T so that seeds are properly delivered to each seedling compartment by gently tilting and shaking the seeding paddle 12. Should any seeds 46 remain on the seed support surface 42 at the end of planting, one may shake them into the channel 48 and, more particularly the first portion 56 of the channel. One may then tip the end of the seed tray 14 opposite the opening 60 upward so that the seeds 46 in the first portion 56 of the channel 48 pour from the opening back into a seed packet or storage container.

Figure 7A:
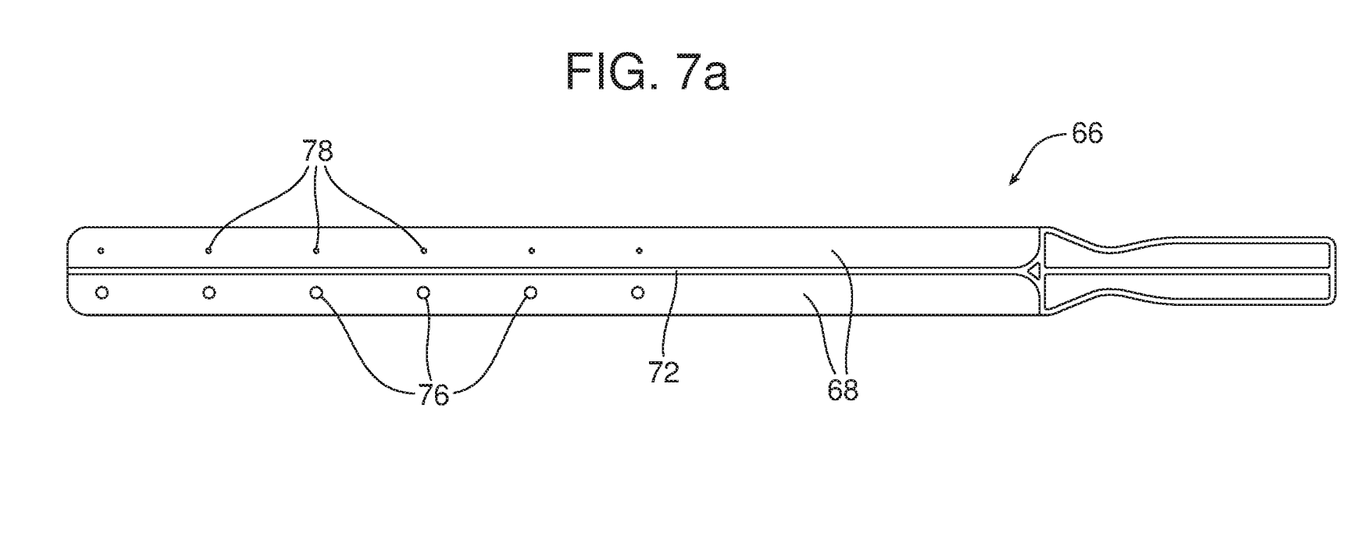
FIGS. 7a and 7b are respective top plan views of the third face and fourth face of a second seeding paddle.
Figure 7B:
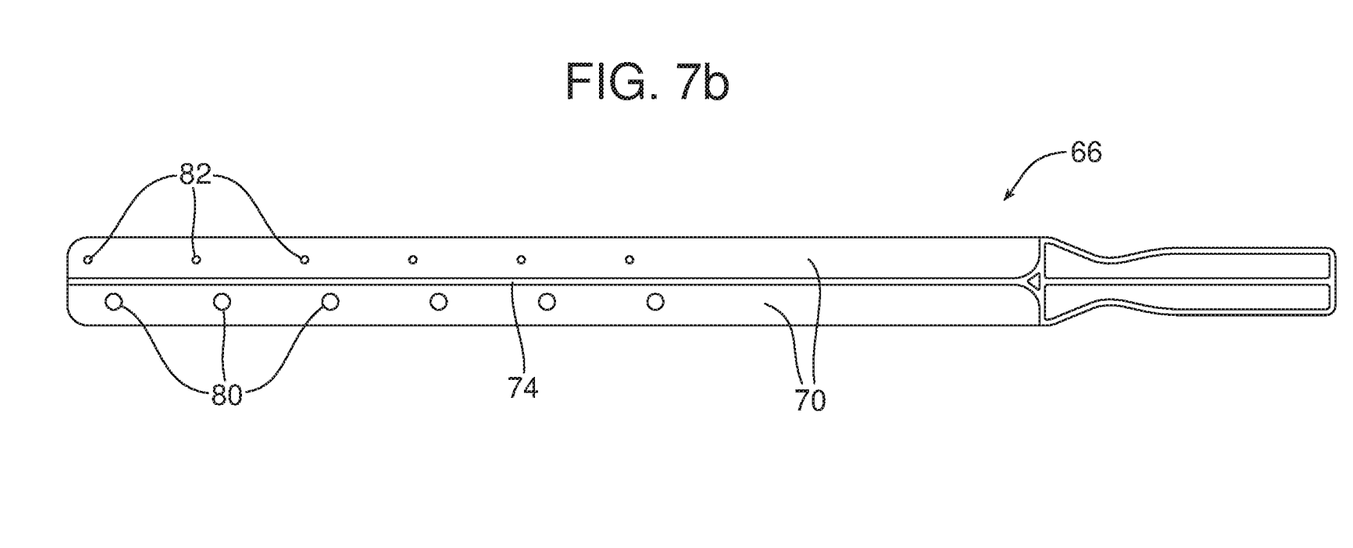

Reference is now made to FIGS. 7a and 7b showing a second seeding paddle 66 that is very similar to the first seeding paddle 12. The second seeding paddle 66 includes third and fourth faces 68, 70 divided into two sections each by respective third and fourth partition flanges 72, 74. A fifth set of seed holders 76 and a sixth set of seed holders 78 are provided on the respective fifth and sixth sections of the third face 68 while a seventh set of seed holders 80 and an eighth set of seed holders 82 are provided on the seventh and eighth sections of the fourth face 70.

Figure 8A:
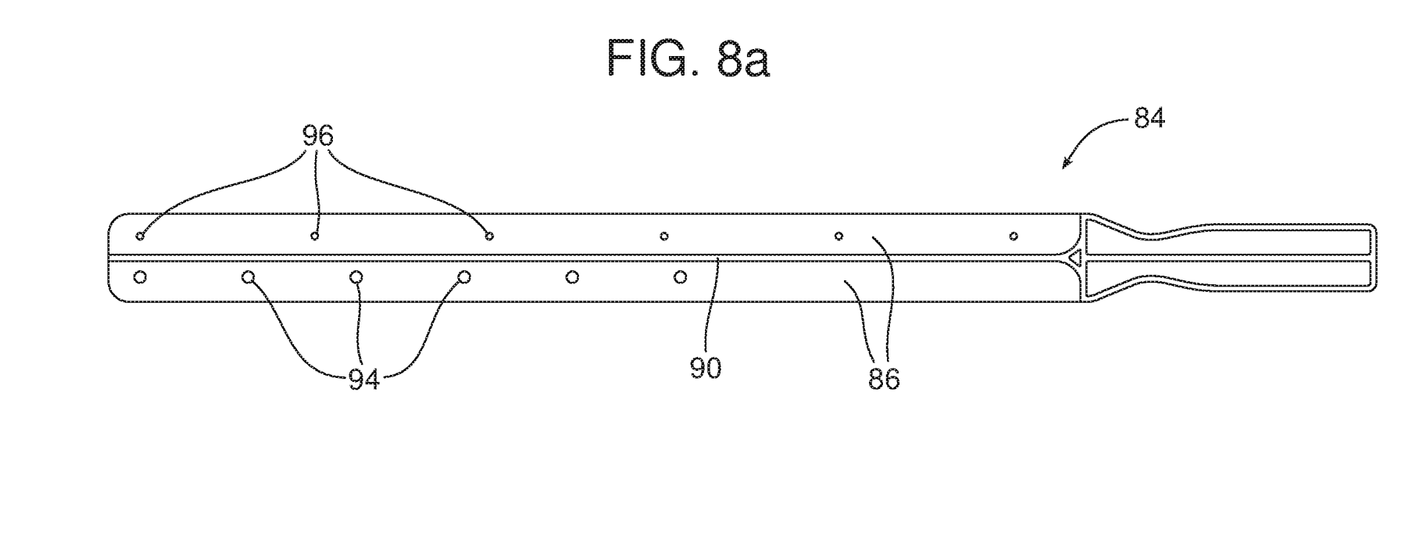
FIGS. 8a and 8b are respective top plan views of the fifth face and sixth face of a third seeding paddle.
Figure 8B:
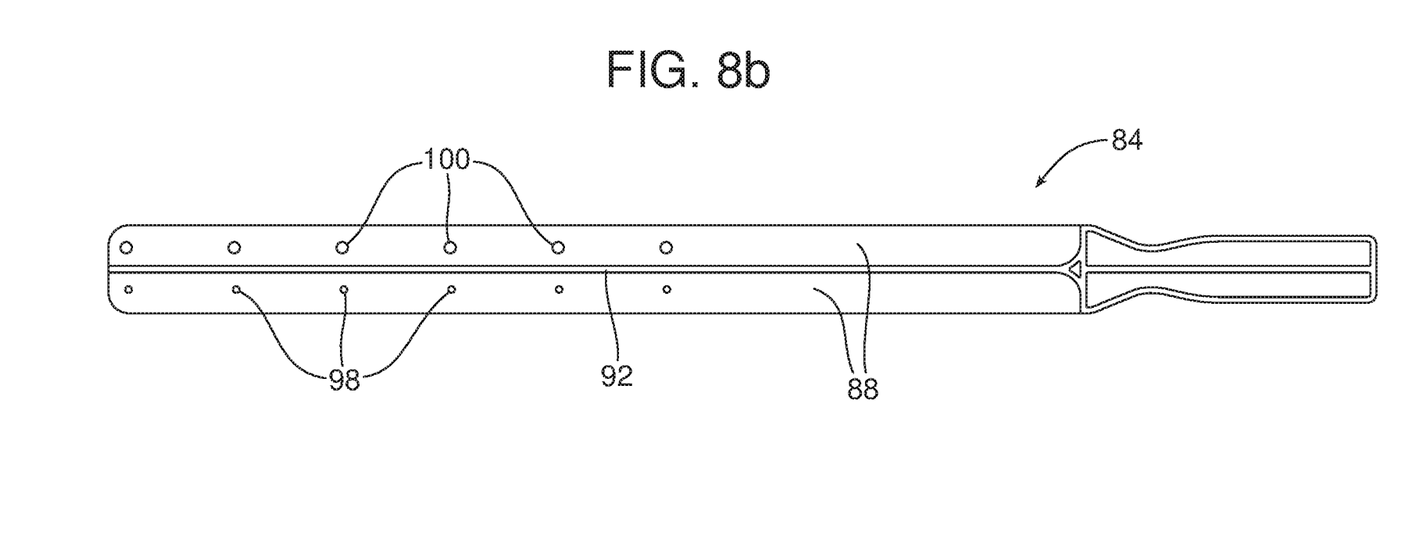

Similarly, as illustrated in FIGS. 8a and 8b, a third seeding paddle 84 includes a fifth face 86 and a sixth face 88 with each of those two faces divided by respective fifth and sixth partition flanges 90, 92. The fifth partition flange 90 includes a ninth set of seed holders 94 and a tenth set of seed holders 96 on the respective ninth and tenth sections of the fifth face and an eleventh set of seed holders 98 and a twelfth set of seed holders 100 on the respective eleventh and twelfth sections of the sixth face. As should be appreciated, all of the sets of seed holders include cavities of different sizes with a user selecting the cavity of desired size to hold and plant the different size seeds to be used in planting. Thus, a seeding kit is also provided wherein that kit comprises one or more seeding paddles 12, 66, 84 having sets of seed holders 24, 26, 36, 38, 76, 78, 80, 82, 94, 96, 98, 100 and a cooperating seed tray 14 as described above.

The foregoing has been presented for purposes of illustration and description. It is not intended to be exhaustive or to limit the embodiments to the precise form disclosed. Obvious modifications and variations are possible in light of the above teachings. For example, as illustrated in FIG. 1, a detent 102 may be provided on the seed tray 14 at the open end 60 of the first portion 56 of the channel 48. A cooperating socket or aperture 104 may be provided on each side of the handle 62 where the handle meets with the partition flanges 18, 30. When the seeding paddle 12 is properly seated in the channel 48 of the seed tray 14, the detent 102 rests in the aperture 104 so as to resist the potential for the paddle 12 to slide out of the channel 48 through the open end of 60. As a consequence, the stop 64 on the handle 62 is maintained in position to close the opening 60 by engaging flush with the raised edge 44.

All such modifications and variations are within the scope of the appended claims when interpreted in accordance with the breadth to which they are fairly, legally and equitably entitled.

What is claimed:

1. A seeding device for seeds, comprising:
    a seeding paddle including a plurality of closed-end seed holder cavities, a first face and a second face, wherein said first face includes a first partition flange extending along a longitudinal dimension of said first face and dividing said first face into a first section and a second section, and wherein said plurality of closed-end seed holder cavities include a first set of closed-end seed holder cavities on said first section of said first face and a second set of closed-end seed holder cavities on said second section of said first face; and
    a seed tray having (a) a seed support surface adapted to receive the seeds, (b) a raised edge to maintain the seeds on the seed support surface and (c) a channel dividing said seed support surface, said channel being adapted for receiving said seeding paddle whereby the seeds on said seed support surface are transferred from the seed support surface into said plurality of closed-end seed holder cavities.

2. The seeding device of claim 1, wherein said second face includes a second partition dividing said second face into a third section and a fourth section.

3. The seeding device of claim 2, wherein said plurality of closed-end seed holder cavities include a third set of closed-end seed holder cavities on said third section of said second face and a fourth set of closed-end seed holder cavities on said fourth section of said second face wherein said first set of closed-end seed holder cavities are a first size, said second set of closed-end seed holder cavities are a second size, said third set of closed-end seed holder cavities are a third size and said fourth set of closed-end seed holder cavities are a fourth size and said first size, said second size, said third size and said fourth size are all different.

4. The seeding device of claim 3, wherein each closed-end seed holder cavity is cylindrical in shape.

5. The seeding device of claim 3, wherein each closed-end seed holder cavity is frustoconical in shape.

6. The seeding device of claim 3, wherein said seeding paddle includes a handle.

7. The seeding device of claim 6, wherein said channel divides said seed support surface into two sections.

8. The seeding device of claim 7, wherein said channel includes a support shelf dividing said channel into a first portion that receives said first partition flange or said second partition flange and a second portion wherein said second portion has a width $W_2$ and said first portion has a width $W_1$, where $W_2 > W_1$.

9. The seeding device of claim 8, wherein said first face is flush with said seed support surface when said second face is resting on said support shelf and said second face is flush with said seed support surface when said first face is resting on said support shelf.

10. The seeding device of claim 9, wherein said channel includes an opening at one end.

11. The seeding device of claim 10, wherein said handle includes a stop sized and shaped to correspond to said opening and wherein said opening is closed when said seeding paddle is seated in said seed tray.

12. A method of planting seeds in a substrate, comprising:
    selecting a seeding paddle with a plurality of spaced seed holders of desired size for seeds to be planted;
    placing said seeding paddle into a channel dividing a seed support surface of a seed tray;
    shaking seeds on the seed support surface of said seed tray down into said plurality of spaced seed holders in said seeding paddle;
    removing said seeding paddle from the channel of said seed tray with seeds retained in said seed holders; and
    delivering the seeds from said plurality of said spaced seed holders onto said substrate at spaced locations.

13. The method of claim 12, including recovering any excess seeds on said seed tray by tipping said seed tray to cause said excess seeds to be dispersed from said seed tray through a seed recovery opening.

* * * * *